US012750856B2

(12) United States Patent
Zhao et al.

(10) Patent No.: US 12,750,856 B2
(45) Date of Patent: Sep. 29, 2026

(54) WIRELESS COMMUNICATION METHOD AND COMMUNICATIONS DEVICE

(71) Applicant: QUECTEL WIRELESS SOLUTIONS CO., LTD., Shanghai (CN)

(72) Inventors: Zheng Zhao, Shanghai (CN); Ling Lyu, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 19/382,904

(22) Filed: Nov. 7, 2025

(65) Prior Publication Data

US 2026/0067895 A1 Mar. 5, 2026

Related U.S. Application Data

(63) Continuation of application No. PCT/CN2024/077440, filed on Feb. 18, 2024.

(51) Int. Cl.

*H04W 4/00* (2018.01)
*H04W 72/23* (2023.01)
*H04W 74/0833* (2024.01)
*H04W 76/38* (2018.01)

(52) U.S. Cl.

CPC ....... *H04W 72/23* (2023.01); *H04W 74/0833* (2013.01); *H04W 76/38* (2018.02)

(58) Field of Classification Search

CPC .. H04W 72/23; H04W 76/38; H04W 74/0833
USPC .......................................................... 370/329
See application file for complete search history.

(56) References Cited

U.S. PATENT DOCUMENTS

| | | | | |
|---|---|---|---|---|
| 11,616,528 B2 * | 3/2023 | Rico Alvarino | ...... | H04W 72/21 370/329 |
| 11,678,340 B2 * | 6/2023 | Zhang | .................. | H04W 72/21 370/329 |
| 11,844,084 B2 * | 12/2023 | Shim | .................. | H04W 56/005 |
| 12,096,508 B2 * | 9/2024 | Kim | ...................... | H04L 5/0064 |
| 2019/0274061 A1 * | 9/2019 | Luo | ....................... | H04W 24/10 |
| 2020/0351023 A1 * | 11/2020 | Rico Alvarino | .. | H04W 52/0209 |
| 2020/0351844 A1 * | 11/2020 | Rico Alvarino | ...... | H04L 1/1819 |

(Continued)

FOREIGN PATENT DOCUMENTS

| | | |
|---|---|---|
| CN | 117397319 A | 1/2024 |
| WO | WO 2024011445 A1 | 1/2024 |

OTHER PUBLICATIONS

International Search Report in International Appln. No. PCT/CN2024/077440, mailed on Jul. 17, 2024, 7 pages (with English translation).

*Primary Examiner* — Marceau Milord
(74) *Attorney, Agent, or Firm* — Fish & Richardson P.C.

(57) ABSTRACT

The present application provides a wireless communication method and a communications device. One example method includes: receiving, by a terminal device, first information from a first transmitting and receiving point; and determining, by the terminal device based on the first information, a first downlink reference timing corresponding to a first timing advance (TA), wherein the first TA corresponds to the first transmitting and receiving point, the first transmitting and receiving point is one of a plurality of transmitting and receiving points that communicate with the terminal device, and the first information indicates a determination mode of the first downlink reference timing.

14 Claims, 4 Drawing Sheets

(56) References Cited

U.S. PATENT DOCUMENTS

| | | | | |
|---|---|---|---|---|
| 2021/0243732 | A1* | 8/2021 | Zhang | H04W 72/23 |
| 2022/0167419 | A1* | 5/2022 | Zhang | H04B 7/0695 |
| 2022/0330223 | A1* | 10/2022 | Xue | H04W 76/23 |
| 2023/0015705 | A1* | 1/2023 | Chang | H04W 36/0072 |
| 2023/0345285 | A1* | 10/2023 | Zheng | H04W 24/10 |
| 2025/0133513 | A1* | 4/2025 | Cao | H04W 56/0045 |

* cited by examiner

WIRELESS COMMUNICATION METHOD AND COMMUNICATIONS DEVICE

CROSS-REFERENCE TO RELATED APPLICATIONS

This application is a continuation of International Application No. PCT/CN2024/077440, filed on Feb. 18, 2024, the disclosure of which is hereby incorporated by reference in its entirety.

TECHNICAL FIELD

The present application relates to the field of communications technologies, and more specifically, to a wireless communication method and a communications device.

BACKGROUND

In a transmission scenario with a plurality of transmitting and receiving points (transmit/receive point, TRP), a terminal device may communicate with a plurality of transmitting and receiving points, and the terminal device may perform uplink synchronization based on a timing advance (timing advance, TA) corresponding to a transmitting and receiving point. Different transmitting and receiving points may have asynchronous clocks, or different transmitting and receiving points correspond to different downlink reference timings. Before performing uplink synchronization based on a TA, the terminal device needs to perform downlink synchronization based on a downlink reference timing corresponding to the TA. However, currently there is no proper solution on how the terminal device determines a downlink reference timing corresponding to a TA.

SUMMARY

The present application provides a wireless communication method and a communications device. Several aspects of embodiments of the present application are described below.

According to a first aspect, a wireless communication method is provided, including: receiving, by a terminal device, first information transmitted by a first transmitting and receiving point; and determining, by the terminal device based on the first information, a first downlink reference timing corresponding to a first timing advance TA, where the first TA corresponds to the first transmitting and receiving point, the first transmitting and receiving point is one of a plurality of transmitting and receiving points that communicate with the terminal device, and the first information is used to indicate a determination mode of the first downlink reference timing.

According to a second aspect, a wireless communication method is provided, including: transmitting, by a first transmitting and receiving point, first information to a terminal device, where the first information is used by the terminal device to determine, based on the first information, a first downlink reference timing corresponding to a first timing advance TA, the first TA corresponds to the first transmitting and receiving point, the first transmitting and receiving point is one of a plurality of transmitting and receiving points that communicate with the terminal device, and the first information is used to indicate a determination mode of the first downlink reference timing.

According to a third aspect, a terminal device is provided, including: a receiving unit, receiving first information transmitted by a first transmitting and receiving point; and a first determining unit, determining, based on the first information, a first downlink reference timing corresponding to a first timing advance TA, where the first TA corresponds to the first transmitting and receiving point, the first transmitting and receiving point is one of a plurality of transmitting and receiving points that communicate with the terminal device, and the first information is used to indicate a determination mode of the first downlink reference timing.

According to a fourth aspect, a communications device is provided, where the communications device is a first transmitting and receiving point, and includes: a transmitting unit, transmitting first information to a terminal device, where the first information is used by the terminal device to determine, based on the first information, a first downlink reference timing corresponding to a first timing advance TA, where the first TA corresponds to the first transmitting and receiving point, the first transmitting and receiving point is one of a plurality of transmitting and receiving points that communicate with the terminal device, and the first information is used to indicate a determination mode of the first downlink reference timing.

According to a fifth aspect, a terminal device is provided, including a memory, a processor, and a transceiver, where the memory is configured to store one or more computer programs, and the processor is configured to invoke the computer programs in the memory, to cause the terminal device to execute the method according to the first aspect.

According to a sixth aspect, a communications device is provided, where the communications device is a first transmitting and receiving point, and includes a memory, a processor, and a transceiver, the memory is configured to store one or more computer programs, and the processor is configured to invoke the computer programs in the memory, to cause the terminal device to execute the method according to the second aspect.

According to a seventh aspect, an apparatus is provided, including a processor configured to invoke a program from a memory to execute the method according to the first aspect or the second aspect.

According to an eighth aspect, a chip is provided, including a processor configured to invoke a program from a memory to cause a device on which the chip is installed to execute the method according to the first aspect or the second aspect.

According to a ninth aspect, a computer-readable storage medium is provided, where the computer-readable storage medium stores a program, and the program causes a computer to execute the method according to the first aspect or the second aspect.

According to a tenth aspect, a computer program product is provided, where the computer program product includes a program, and the program causes a computer to execute the method according to the first aspect or the second aspect.

According to an eleventh aspect, a computer program is provided, where the computer program causes a computer to execute the method according to the first aspect or the second aspect.

In embodiments of the present application, a first transmitting and receiving point transmits first information to a terminal device, so that the terminal device determines, based on a determination mode indicated by the first information, a first downlink reference timing corresponding to a first TA, thereby performing uplink synchronization based on the first TA and the first downlink reference timing.

According to the above solution, the terminal device can determine the downlink reference timing corresponding to a TA.

DETAILED DESCRIPTIONS OF THE EMBODIMENTS

The technical solutions in the present application are described below with reference to the accompanying drawings.

Architecture of a Communications System

Figure 1:
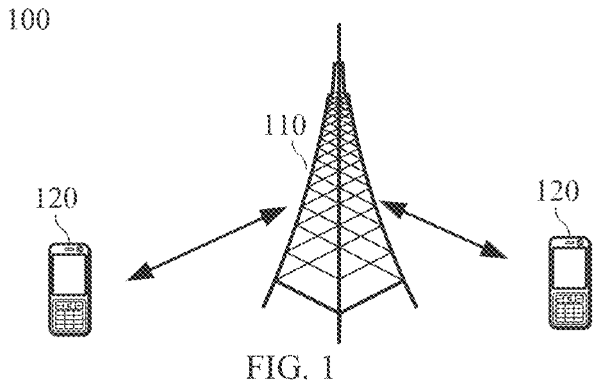
FIG. 1 shows a wireless communications system 100 to which an embodiment of the present application is applied.

FIG. 1 shows a wireless communications system 100 to which an embodiment of the present application is applied. The wireless communications system 100 may include a network device 110 and a terminal device 120. The network device 110 may be a device that communicates with the terminal device 120. The network device 110 may provide communication coverage for a specific geographic area, and may communicate with a terminal device 120 within the coverage.

FIG. 1 exemplarily shows one network device and two terminal devices. Optionally, the wireless communications system 100 may include a plurality of network devices, and another quantity of terminal devices may be included in coverage of each network device. This is not limited in embodiments of the present application.

Optionally, the wireless communications system 100 may further include another network entity such as a network controller or a mobility management entity. This is not limited in the embodiments of the present application.

It should be understood that the technical solutions in the embodiments of the present application may be applied to various communications systems, for example, a 5th generation (5th generation, 5G) system or new radio (new radio, NR), a long term evolution (long term evolution, LTE) system, an LTE frequency division duplex (frequency division duplex, FDD) system, and LTE time division duplex (time division duplex, TDD) system. The technical solutions provided in the present application may be further applied to a future communications system, such as a sixth generation mobile communications system or a satellite communications system.

The terminal device in the embodiments of the present application may also be referred to as user equipment (user equipment, UE), an access terminal, a subscriber unit, a subscriber station, a mobile site, a mobile station (mobile station, MS), a mobile terminal (mobile terminal, MT), a remote station, a remote terminal, a mobile device, a user terminal, a terminal, a wireless communications device, a user agent, or a user apparatus. The terminal device in the embodiments of the present application may be a device providing a user with voice and/or data connectivity and capable of connecting people, objects, and machines, such as a handheld device or vehicle-mounted device having a wireless connection function. The terminal device in the embodiments of the present application may be a mobile phone (mobile phone), a tablet computer (Pad), a notebook computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in remote medical surgery (remote medical surgery), a wireless terminal in smart grid (smart grid), a wireless terminal in transportation safety (transportation safety), a wireless terminal in smart city (smart city), a wireless terminal in smart home (smart home), or the like. Optionally, the UE may function as a base station. For example, the UE may function as a scheduling entity, which provides a sidelink signal between UEs in V2X, D2D, or the like. For example, a cellular phone and a vehicle communicate with each other by using a sidelink signal. A cellular phone and a smart home device communicate with each other, without relaying a communication signal by using a base station.

The network device in the embodiments of the present application may be a device for communicating with a terminal device. The network device may also be referred to as an access network device or a radio access network device. For example, the network device may be a base station. The network device in the embodiments of the present application may be a radio access network (radio access network, RAN) node (or device) that connects a terminal device to a wireless network. The base station may broadly cover various names below, or may be replaced with the following names, such as a NodeB (NodeB), an evolved NodeB (evolved NodeB, eNB), a next generation NodeB (next generation NodeB, gNB), a relay station, a transmitting and receiving point (transmitting and receiving point, TRP), a transmitting point (transmitting point, TP), a master MeNB, a secondary SeNB, a multi-standard radio (MSR) node, a home base station, a network controller, an access node, a wireless node, an access point (access point, AP), a transmission node, a transceiver node, a baseband unit (base band unit, BBU), a remote radio unit (Remote Radio Unit, RRU), an active antenna unit (active antenna unit, AAU), a remote radio head (remote radio head, RRH), a central unit (central unit, CU), a distributed unit (distributed unit, DU), and a positioning node. The base station may be a macro base station, a micro base station, a relay node, a donor node, or the like, or a combination thereof. Alternatively, the base station may be a communications module, a modem, or a chip disposed in the device or apparatus described above. Alternatively, the base station may be a mobile switching center, a device that functions as a base station in deviceto-device D2D, vehicle-to-everything (vehicle-to-everything, V2X), and machine-to-machine (machine-to-machine, M2M) communications, a network-side device in a 6G network, a device that functions as a base station in a future communications system, or the like. The base station may support networks of a same access technology or different access technologies. A specific technology and a specific device form used by the network device are not limited in the embodiments of the present application.

The base station may be fixed or mobile. For example, a helicopter or an unmanned aerial vehicle may be configured to function as a mobile base station, and one or more cells may move depending on a location of the mobile base station. In another example, a helicopter or an unmanned aerial vehicle may be configured to serve as a device that communicates with another base station.

In some deployments, the network device in the embodiments of the present application may be a CU or a DU, or the network device includes a CU and a DU. The gNB may further include an AAU.

The network device and the terminal device may be deployed on land, including being indoors or outdoors, handheld, or vehicle-mounted, may be deployed on a water surface, or may be deployed on a plane, a balloon, or a satellite in the air. In the embodiments of the present application, a scenario in which the network device and the terminal device are located is not limited.

It should be understood that all or some of functions of the communications device in the present application may also be implemented by software functions running on hardware, or by virtualization functions instantiated on a platform (for example, a cloud platform).

Timing Advance (Timing Advance, TA)

An orthogonal frequency division multiplexing (orthogonal frequency division multiplexing, OFDM) transmission scheme may be used in a wireless communications system (such as an LTE/NR system). This is because the wireless communications system has good demodulation performance only when subcarriers keep orthogonal with each other. However, due to a transmission delay, a downlink signal is received by a terminal device after a specified delay. Because different terminal devices have different locations relative to a network device, uplink signals transmitted by different terminal devices arrive at the network device at different times, severely affecting orthogonality of subcarriers, and resulting in reduction of demodulation performance of the OFDM transmission scheme.

Uplink transmission is used as an example. An important feature of uplink transmission is that orthogonal multiple access of different terminal devices is implemented in time and frequency, that is, uplink transmission of different terminal devices from a same cell does not interfere with each other. Uplink transmission is generally transmission of a plurality of terminal devices. In this way, the network device may receive signals from a plurality of terminal devices at a same time.

To ensure orthogonality of uplink transmission and avoid intra-cell (intra-cell) interference, the network device requires that times when signals transmitted, at a same instant, from different terminal devices in different frequency resources reach the network device are substantially aligned. This is because that the network device can correctly decode uplink data transmitted by a terminal device provided that the network device receives the uplink data within a cyclic prefix range. In addition, to maintain orthogonality between uplink reference signals on which different cyclic shifts are used, the network device also requires that received uplink reference signals are aligned in terms of time. Therefore, to implement uplink synchronization, or to ensure time synchronization on a network device side, the wireless communications system (such as an LTE/NR system) may support an uplink TA mechanism.

A TA may be understood as a command that is transmitted by the network device to a terminal device to adjust uplink transmission of the terminal device. Uplink transmission of a terminal device is not limited in embodiments of the present application. For example, the uplink transmission may include one or more of the following: a physical uplink shared channel (physical uplink shared channel, PUSCH), a physical uplink control channel (physical uplink control channel, PUCCH), or a sounding reference signal (sounding reference signal, SRS).

In a communications system supporting an uplink TA, an uplink clock and a downlink clock on the network device side are the same, but there is an offset between an uplink clock and a downlink clock on a terminal device side, and different terminal devices have different uplink TAs. From the perspective of the terminal device, a TA is essentially an offset between a start time instant at which the terminal device receives a downlink frame and a time instant at which the terminal device transmits an uplink frame. The network device appropriately controls offsets of different terminal devices, so that time instants when uplink signals from different terminal devices reach the network device are substantially aligned. Due to a relatively large transmission delay, a terminal device that is far from the network device transmits uplink data earlier than a terminal device that is near to the network device.

Figure 2A:
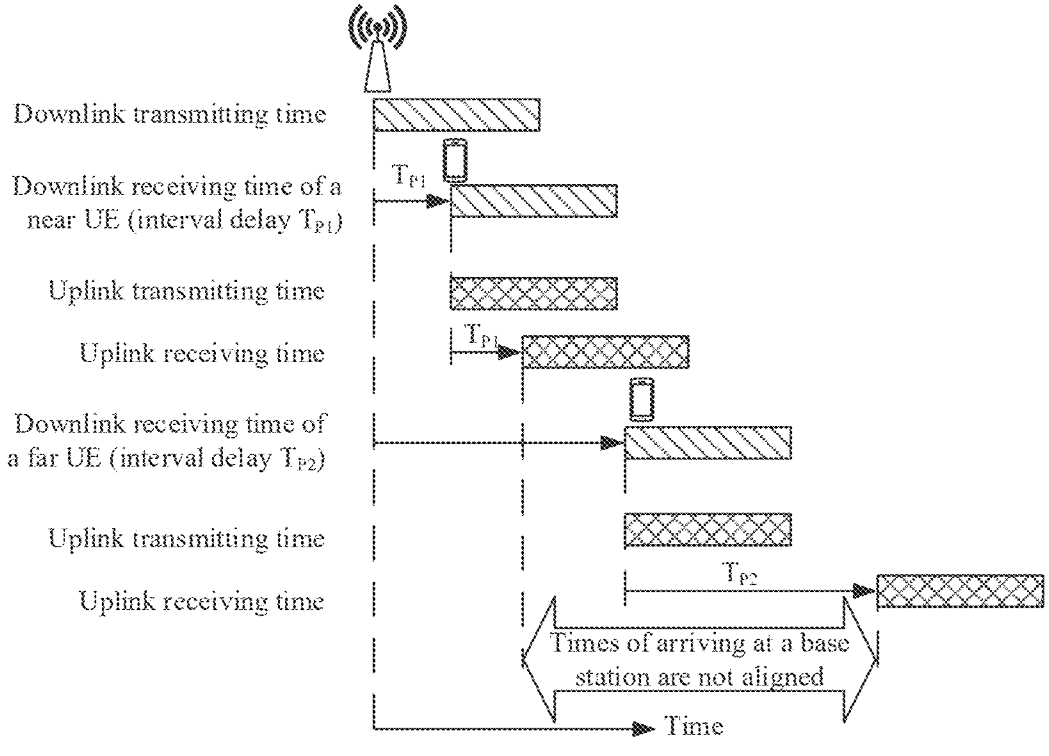
FIG. 2A is an example diagram of an uplink transmission delay when there is no TA mechanism.
Figure 2B:
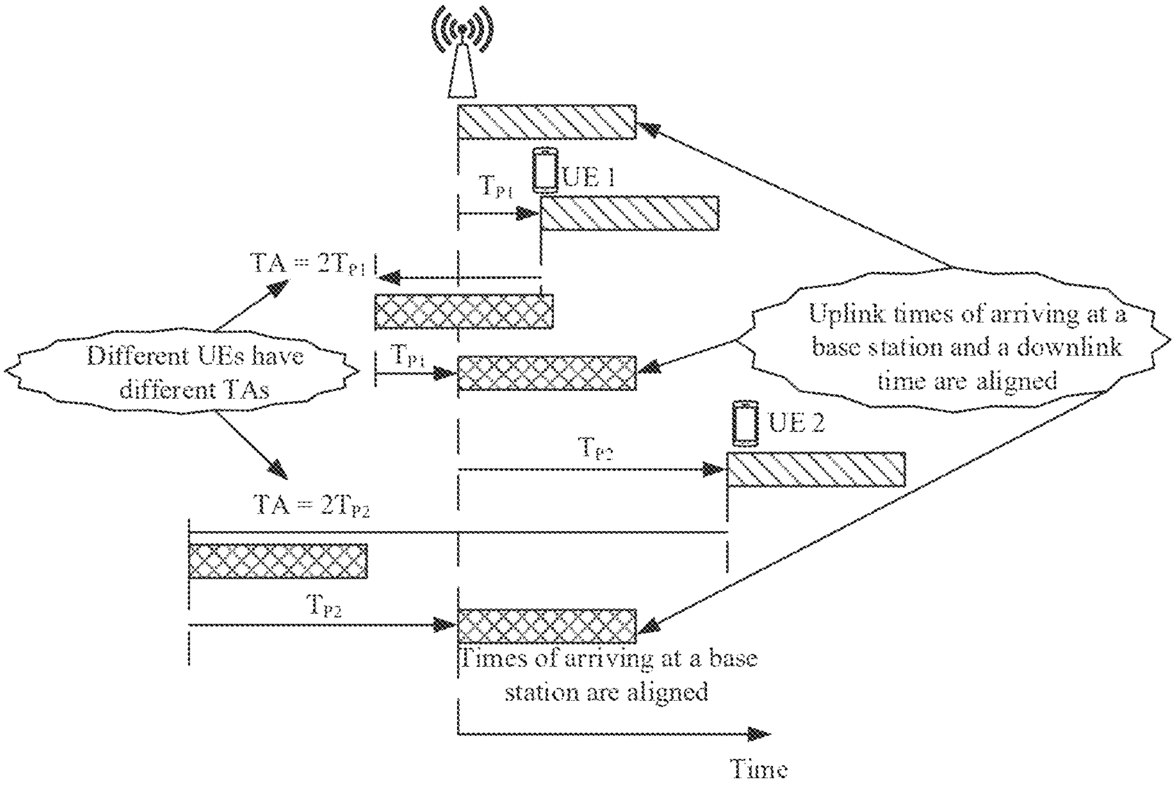
FIG. 2B is an example diagram of an uplink transmission delay when there is a TA mechanism.

FIG. 2A shows a delay of an uplink signal arriving at a network device when there is no TA, and FIG. 2B shows a delay of an uplink signal arriving at a network device when there is a TA. As shown in FIG. 2A, when there is no TA, uplink signals transmitted by different terminal devices (for example, terminal devices that have different distances from a network device) arrive at the network device at different time instants, which may cause intra-cell interference. Referring to FIG. 2B, different terminal devices are configured with different uplink TAs, so that uplink signals transmitted by different terminal devices arrive at the network device at a same time, thereby being beneficial to avoid intra-cell interference. For example, as shown in FIG. 2B, different terminal devices are respectively a terminal device 1 and a terminal device 2. If the terminal device 1 and the terminal device 2 synchronously receive downlink signals and transmit uplink signals, the uplink signals transmitted by the terminal device 1 and the terminal device 2 have offsets of $2T_{p1}$ and $2T_{p2}$ relative to the network device, so that the uplink signals transmitted by the terminal device 1 and the terminal device 2 arrive at the network device at a same time. In other words, if the terminal device 1 and the terminal device 2 synchronously receive downlink signals and transmit uplink signals, TAs corresponding to the terminal device 1 and the terminal device 2 are respectively $2T_{p1}$ and $2T_{p2}$, so that the uplink signals transmitted by the terminal device 1 and the terminal device 2 arrive at the network device at a same time.

The network device may determine a TA value of each terminal device by measuring uplink transmission of the terminal device. The network device may transmit a TA command to the terminal device, to notify the terminal device of a corresponding TA value. For example, the network device may transmit the TA command to the terminal device in two manners, and details are as follows:

Manner 1: An initial TA is obtained. The terminal device may implement initial uplink synchronization by using a random access procedure. In the random access procedure, the network device may determine a TA value by measuring a received preamble (preamble), and transmit the TA value to the terminal device by using a TA command (timing advance command, TAC) field in a random access response (random access response, RAR) message. For example, the network device may add a 12-bit TAC to the RAR message, so as to indicate the initial TA to the terminal device.

Manner 2: A TA is adjusted in a radio resource control (radio resource control, RRC) connected state. In a random access procedure, uplink synchronization is implemented between the terminal device and the network device, but timings of uplink signals arriving at the network device may change with time. For example, in an unstable environment such as multi-path propagation and clock drift, uplink synchronization changes. Therefore, the terminal device needs to continuously update an uplink TA to maintain uplink synchronization. If a TA of a terminal device needs to be corrected, the network device may transmit a TA command to the terminal device, to instruct the terminal device to adjust an uplink timing. In some implementations, the TA command is transmitted by the network device to the terminal device by using a media access control control element (media access control control element, MAC CE). The MAC CE may also be referred to as a TA command MAC CE (that is, an MAC CE that carries a TA command). In other words, when the terminal device is in an RRC connected state, the terminal device may adjust uplink transmission based on an MAC CE that carries a TA command.

In scenarios such as carrier aggregation and multiple input multiple output, the terminal device may support different carriers or serving cells, and different carriers may have different TAs. Therefore, a timing advance group (timing advance group, TAG) is further introduced. Generally, one TAG may include a TA of one or more serving cells. In other words, a plurality of serving cells in a same TAG have a same TA.

Communication Scenario with a Plurality of Transmitting and Receiving Points (Transmit/Receive Point, TRP)

In some communications systems (such as NR), a network device may be configured with a plurality of TRPs. In other words, the network device may communicate with a terminal device by using one or more of the plurality of TRPs, which is also referred to as "multi-TRP communication". The multi-TRP solution can provide high-reliability, wide-range, and high-throughput network performance through flexible deployment. In embodiments of the present application, a TRP refers to a transmitting point or a receiving point in a wireless communications system, or may be a base station, a relay station, or another communications device.

Figure 3:
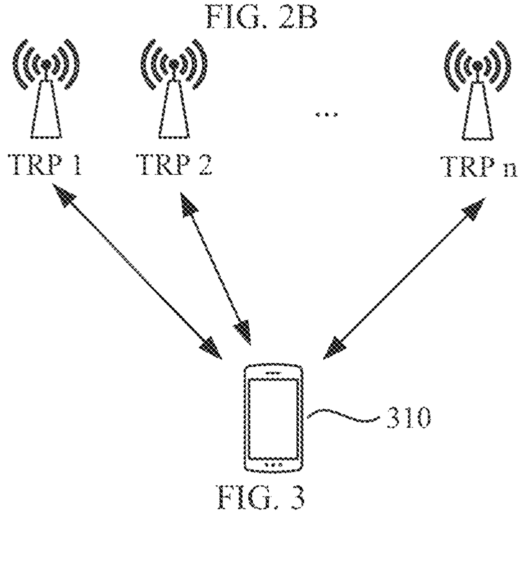
FIG. 3 is a schematic diagram of a scenario of multi-TRP communication.

FIG. 3 is a schematic diagram of a multi-TRP scenario to which a wireless communication method provided in an embodiment of the present application is applied. FIG. 3 shows a terminal device 310 and a plurality of transmitting and receiving points (a TRP 1, a TRP 2, . . . , a TRP n). A serving cell may perform resource scheduling for the terminal device 310 from a plurality of transmitting and receiving points, to provide better coverage, reliability, and data rates for a physical downlink shared channel (physical downlink shared channel, PDSCH), a physical downlink control channel (physical downlink control channel, PDCCH), a physical uplink shared channel (physical uplink shared channel, PUSCH), and a physical uplink control channel (physical uplink control channel, PUCCH).

Multi-TRP downlink scheduling modes include a single-DCI mode and a multi-DCI mode. The two modes are separately described below.

In the single-DCI mode, the terminal device is scheduled by a plurality of TRPs by using same DCI. In the multi-DCI mode, each TRP performs scheduling by using respective DCI. In the multi-DCI mode, a TRP 1 and a TRP 2 are used as an example, the TRP 1 may schedule transmission of a PDSCH 1 by using DCI carried on the PDCCH 1, and the TRP 2 may schedule transmission of a PDSCH 2 by using DCI carried on the PDCCH 2.

The multi-TRP communication scenario may be applied to a multiple input multiple output (multiple input multiple output, MIMO) system. The MIMO system in which a plurality of TRPs are used may provide spatial diversity, and spatial distribution between the plurality of TRPs may provide richer spatial diversity, thereby being beneficial to reduce signal attenuation in space and improving signal reliability.

After antenna configuration of a plurality of TRPs is properly designed and controlled, beamforming (beamforming) of different TRPs cooperates with each other, so that beamforming can be implemented, thereby concentrating signal energy in a specific direction, and improving signal strength. A plurality of TRPs may make better use of different paths in a multi-path propagation environment, thereby reducing influence of a multi-path effect on a signal. The MIMO system can significantly improve a capacity of a communications system, and allow simultaneous transmission of a plurality of data streams, thereby improving a system throughput.

In the multi-TRP based MIMO system, there are different distances from the terminal device to a plurality of TRPs. When the terminal device transmits uplink information to the plurality of TRPs at a same instant, different TAs may be configured for uplink transmission between the terminal device and different TRPs in some related technologies, to improve uplink transmission performance of the MIMO system. In this case, a timing advance is generally changed between different transmitting and receiving points in a same cell. In this case, the following aspects need to be considered:

(1) Multi-TA support: The communications system needs to support configuration and management of a plurality of TAs, to meet timing advance requirements of different TRPs.

(2) Process in which a random access signal (random access channel, RACH) is triggered by using a PDCCH order (order): If a process in which an RACH is triggered by using a PDCCH order is involved, it needs to ensure that an RACH is triggered for different TRPs by using a PDCCH order in a multi-TRP operation.

(3) Downlink reference timing (downlink reference timing): A reference timing for a downlink may need to be adjusted based on timing advances of different TRPs.

(4) Management of a synchronization signal block (synchronization signal block, SSB) and a physical layer reference signal (Physical Layer Reference Signal, PL-RS): Power of PRACH transmission may be controlled in combination of management of an SSB and a PL-RS, especially in a cross-TRP case.

In an uplink transmission process with a plurality of TRPs, the terminal device separately adjusts a TA forward based on a downlink reference timing of each TRP, to perform transmission in advance, so that the plurality of TRPs can simultaneously or almost simultaneously receive uplink information transmitted by the terminal device. For example, the downlink reference timing may be a timing determined when the terminal device performs downlink synchronization with a plurality of TRPs.

In the foregoing technical solution, the terminal device locally stores a correspondence between a timing advance group identifier and a downlink reference timing. When transmitting uplink data, the terminal device determines, based on the correspondence, a downlink reference timing corresponding to a TA, and then adjusts the TA based on the downlink reference timing. However, this manner is not flexible, and cannot be adaptive to constantly changed communication scenarios.

Figure 4:
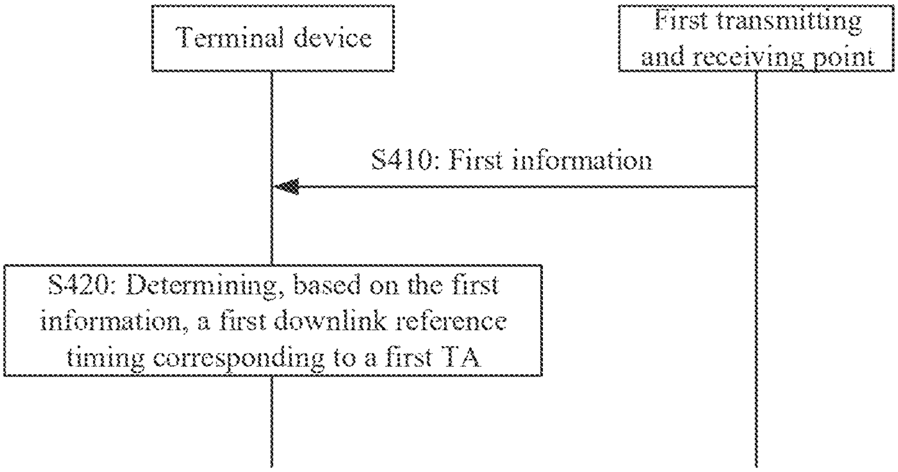
FIG. 4 is a schematic flowchart of a wireless communication method according to an embodiment of the present application.

FIG. 4 is a schematic flowchart of a wireless communication method according to an embodiment of the present application. FIG. 4 is described from a perspective of interaction between a terminal device and a first transmitting and receiving point, and the terminal device may be a terminal device 120 in FIG. 1 or a terminal device 310 in FIG. 3. The wireless communication method in FIG. 4 includes Step S410 and Step S420.

In step S410, a first transmitting and receiving point transmits first information to a terminal device.

The first transmitting and receiving point may be one of a plurality of transmitting and receiving points that communicate with the terminal device, and the plurality of transmitting and receiving points may be, for example, some or all TRPs in a TRP 1 to a TRP n in FIG. 3.

A quantity of the plurality of transmitting and receiving points is not specifically limited in this embodiment of the present application. In an example, there may be two transmitting and receiving points, and the two transmitting and receiving points may be the TRP 1 and the TRP 2 in FIG. 3. For example, the first transmitting and receiving point may be the TRP 1.

The plurality of transmitting and receiving points may communicate with the terminal device at a same time. This transmission manner is also referred to as transmission with multiple transmitting and receiving points, mTRP transmission, or M-TRP transmission. The plurality of transmitting and receiving points transmit downlink data to the terminal device in the following two manners.

Manner 1: A solution based on a single PDCCH, which may be also referred to as a single-DCI solution. The terminal device detects only one PDCCH, and the terminal device may obtain DCI through detecting the PDCCH. The DCI may be used to indicate related indication information simultaneously transmitted on the plurality of transmitting and receiving points. Detection complexity of this manner is relatively low.

Manner 2: A solution based on a plurality of PDCCHs, which may be also referred to as a multi-DCI solution. The terminal device may receive different PDCCHs from different transmitting and receiving points, and each PDCCH may include DCI. The DCI may be used to indicate related indication information of data transmission corresponding to each transmitting and receiving point. Complexity of this manner may increase, but flexibility and robustness of this manner are relatively good.

In a communications system with a plurality of transmitting and receiving points, the plurality of transmitting and receiving points may be located in a same cell, or may be located in different cells. Alternatively, the plurality of transmitting and receiving points may not be all located in a same cell, in other words, some of the plurality of transmitting and receiving points are located in a same cell.

The technical solution provided in this embodiment of the present application is mainly applied to a multi-DCI scenario in which a plurality of transmitting and receiving points are located in a same cell.

An indication manner of the first information is not limited in this embodiment of the present application. The first information may be carried in a PDCCH order (PDCCH order), or the first information may be carried in DCI.

In some implementations, the first information may be a bit field in the DCI, and the bit field may be an added field in the DCI, or the bit field may be an existing field in the DCI, that is, the first information is represented by reusing the existing field. The terminal device may determine the first information by receiving and parsing the PDCCH order or the DCI.

In step S420, the terminal device determines, based on the first information, a first downlink reference timing corresponding to a first TA.

The first TA is a timing advance between the terminal device and the first transmitting and receiving point. The terminal device may perform transmission in advance based on the first TA, so that uplink synchronization is implemented between the terminal device and the first transmitting and receiving point. The first downlink reference timing is a timing signal used for synchronization and timing in a downlink between the first transmitting and receiving point and the terminal device. The terminal device may adjust a clock of the terminal device based on the downlink reference timing, to maintain downlink synchronization with the first transmitting and receiving point. In other words, the first downlink reference timing corresponds to both the first TA and the first transmitting and receiving point.

For a communications system including a plurality of cells, cells with a same TA form a timing advance group TAG. Each TAG may include one or more cells, and cells included in each TAG may use a same TA. Each TAG has one TAG ID.

The first TA is a timing advance used when the terminal device communicates with the first transmitting and receiving point, that is, the first TA corresponds to the first transmitting and receiving point. The first TA corresponds to a first timing advance group TAG 1, and the first timing advance group TAG 1 has a unique timing advance group identifier TAG ID. Therefore, the first timing advance TA, the first timing advance group TAG 1, and the first timing advance group identifier TAG ID all correspond to the first transmitting and receiving point.

After determining the first downlink reference timing corresponding to the first TA, the terminal device can determine, based on the first downlink reference timing, how to adjust uplink transmission. In other words, after determining the downlink reference timing, the terminal device determines a timing advance of uplink transmission, so as to implement uplink synchronization.

In some embodiments, the first information is used to indicate a determination mode of the first downlink reference timing. In some implementations, the first information may directly indicate the determination mode of the first downlink reference timing. For example, the first information may directly indicate a mode in which the first downlink reference timing may be determined. In some other implementations, the first information may alternatively indirectly indicate the determination mode of the first downlink reference timing, and the first information may alternatively be a parameter associated with the determination mode of the first downlink reference timing. The terminal device receives the first information, and determines, based on the parameter associated with the determination mode in the first information, a mode in which the first downlink reference timing is to be determined.

In this embodiment of the present application, the first transmitting and receiving point transmits first information to the terminal device, so that the terminal device cany determine, based on the determination mode indicated by the first information, the first downlink reference timing corresponding to a first TA, thereby performing uplink synchronization based on the first TA and the first downlink reference timing. According to the above solution, the terminal device can determine the downlink reference timing corresponding to a TA.

The determination mode of the first downlink reference timing is described in detail below.

In some embodiments, the determination mode of the first downlink reference timing include a first mode and a second mode. The first information may be used to indicate whether the first downlink reference timing is determined in the first mode or the second mode.

In the first mode, the first downlink reference timing is determined based on a first correspondence between a TA and a downlink reference timing. The first mode may also be referred to as a traditional mode.

As described above, the terminal device may be connected to a plurality of transmitting and receiving points at a same time, and the terminal device needs to perform uplink transmission based on different transmitting and receiving points and different timing advances, to implement uplink synchronization with the plurality of transmitting and receiving points. In this case, the terminal device maintains a plurality of timing advance groups, and each timing advance group is associated with one downlink reference timing. Each timing advance group corresponds to one timing advance.

A timing advance in each timing advance group may be determined as follows. In a process in which the terminal device performs random access to a transmitting and receiving point, the transmitting and receiving point determines a TA value by measuring a preamble transmitted by the terminal device, and transmits the TA value to the terminal device by using a TAC field in an RAR message. For example, the first transmitting and receiving point may add a 12-bit TAC to the RAR message, so as to indicate an initial TA to the terminal device.

The downlink reference timing may be a reference timing used by the terminal device to perform downlink synchronization with a transmitting and receiving point in an initial access process. The terminal device adjusts, based on the downlink reference timing, a timing advance corresponding to the downlink reference timing, or adds, to the downlink reference timing, a time advance corresponding to a TA value, and transmits uplink data based on the timing.

In the second mode, the first downlink reference timing is determined based on an SSB indicated in a PDCCH order. The SSB is also referred to as a target SSB.

The SSB may be directly or indirectly indicated in the PDCCH order. This is not limited in this embodiment of the present application.

In a process in which the terminal device communicates with the first transmitting and receiving point, the first transmitting and receiving point may periodically transmit an SSB burst set. Each SSB burst set includes a plurality of SSBs, and the plurality of SSBs are transmitted in a beam sweeping manner in a same transmission period, that is, the SSBs are transmitted by using beams in different directions at different instants.

The target SSB may be one of a plurality of SSBs in an SSB burst set transmitted by the first transmitting and receiving point in any period.

In some embodiments, the target SSB is an SSB with a relatively low transmission delay and/or path loss in beam directions corresponding to a plurality of SSBs.

As the terminal device moves, a relative location between the terminal device and the first transmitting and receiving point changes. The first downlink reference timing is determined by using the SSB that changes in real time, and a timing advance is adjusted for uplink transmission based on the first downlink reference timing, so that a success rate of uplink transmission can be improved.

In some embodiments, the first information is represented by using a first bit, and different values of the first bit may correspond to different determination modes of the first downlink reference timing. For example, a value of the first bit may be 0 or not 0. If the value of the first bit is 0, the determination mode of the first downlink timing is the foregoing first mode. If the value of the first bit is not 0, the determination mode of the first downlink reference timing is the second mode. Certainly, in some implementations, if the value of the first bit is not 0, the determination mode of the first downlink signal is the foregoing first mode. If the value of the first bit is 0, the determination mode of the first downlink reference timing is the second mode.

The first bit may include one or more bits. This is not specifically limited in this embodiment of the present application.

In some embodiments, the first bit is a bit field in DCI, and the bit field may be an added field in the DCI, or an existing field in the DCI may be reused.

In some embodiments, the plurality of transmitting and receiving points further include a second transmitting and receiving point. The second transmitting and receiving point is one of a plurality of transmitting and receiving points that communicate with the terminal device, and the second transmitting and receiving point is different from the first transmitting and receiving point. For example, the second transmitting and receiving point may be the TRP 2 in FIG. 3.

In some implementations, the determination mode of the first downlink reference timing include a third mode and a fourth mode. The first information may be used to indicate whether the first downlink reference timing is determined in the third mode or the fourth mode. The third mode and the fourth mode are separately described below.

In some implementations, in the third mode, the first downlink reference timing is determined based on the first TA.

In some embodiments, the process of determining the first downlink reference timing based on the first TA may include: determining the first downlink reference timing based on the first TA and a first correspondence. The first correspondence includes a correspondence between a TA and a downlink reference timing. As described above, the terminal device maintains a plurality of timing advance groups. Each timing advance group has one TA, and each timing advance group is associated with one downlink reference timing. In other words, the terminal device maintains a correspondence, that is, the first correspondence described above, between a plurality of TAs and a plurality of downlink reference timings. Therefore, the terminal device may determine, based on the first TA and the first correspondence, the first downlink reference timing corresponding to the first TA.

The terminal device may perform downlink synchronization based on the first downlink reference timing, adjust an uplink timing advance based on the first TA, and transmit an uplink signal to the first transmitting and receiving point based on the adjusted uplink timing advance.

It should be noted that, in embodiments of the present application, the first transmitting and receiving point is any one of a plurality of transmitting and receiving points that communicate with the terminal device. Therefore, the terminal device may determine, based on a TA between the terminal device and each transmitting and receiving point, a downlink reference timing used for performing an uplink timing advance with each transmitting and receiving point. In other words, when communicating with each transmitting and receiving point, the terminal device may determine, based on the first correspondence, a downlink reference timing corresponding to a TA between the terminal device and the transmitting and receiving point. When performing uplink transmission to each transmitting and receiving point, the terminal device performs transmission in advance based on a corresponding reference timing and a TA of the terminal device. In this way, it can be ensured that a plurality of transmitting and receiving points that communicate with the terminal device can simultaneously receive uplink signals transmitted by the terminal device.

In some implementations, in the fourth mode, the first downlink reference signal is determined based on a second TA.

The second TA is a timing advance between the terminal device and the second transmitting and receiving point. The second TA may be indicated by the second transmitting and receiving point when the second transmitting and receiving point performs downlink synchronization with the terminal device.

In some embodiments, the process of determining the first downlink reference signal based on the second TA may include: determining the first downlink reference timing based on the second TA and a first correspondence. The first correspondence includes a correspondence between a TA and a downlink reference timing.

As described above, the terminal device may maintain a plurality of timing advance groups, and each timing advance group is associated with one downlink reference timing. Therefore, the terminal device may determine, based on the second TA, a timing advance group to which the second TA belongs, and then use a downlink reference timing corresponding to the timing advance group as the first downlink reference timing.

In embodiments of the present application, the first transmitting and receiving point is any one of the plurality of transmitting and receiving points. A same downlink reference timing may be used for a timing advance performed between the terminal device and the plurality of transmitting and receiving points, and the downlink reference timing may be a downlink reference timing corresponding to a TA between the terminal device and any one of the transmitting and receiving points.

In some scenarios, the terminal device may be only required to perform downlink synchronization with one transmitting and receiving point, to reduce communication complexity. For example, the terminal device may be only required to perform downlink synchronization with the second transmitting and receiving point, that is, the first TA is obtained by performing measuring when the terminal device performs downlink synchronization with the second transmitting and receiving point. When transmitting an uplink signal to the first transmitting and receiving point by using the first TA, the terminal device needs to transmit the uplink signal when downlink synchronization is implemented between the terminal device and the second transmitting and receiving point. In other words, the terminal device needs to use, as the first downlink reference timing, a downlink reference timing corresponding to the second TA.

In some embodiments, the first information may be represented by using a second bit, and different values of the second bit correspond to different determination modes of the first downlink reference timing. A value of the second bit may be 0 or not 0 (such as 1). If the value of the second bit is 0, the determination mode of the first downlink signal is the third mode. If the value of the second bit is not 0, the determination mode of the first downlink reference timing is the fourth mode. Certainly, in some implementations, if the value of the second bit is not 0, the determination mode of the first downlink signal is the foregoing third mode. If the value of the second bit is 0, the determination mode of the first downlink reference timing is the fourth mode.

The second bit may include one or more bits. This is not specifically limited in embodiments of the present application.

In some embodiments, the second bit is a bit field in DCI, and the bit field may be an added field in the DCI, or an existing field in the DCI may be reused. The second field may be different from or the same as the first field.

In some embodiments, the first correspondence may be a correspondence stored in the terminal device, or the first correspondence may be determined by the terminal device based on a second correspondence and a third correspondence.

The second correspondence includes a correspondence between a TA and an SSB, and the third correspondence includes a correspondence between an SSB and a downlink reference timing. The first correspondence is determined based on the second correspondence and the third correspondence, so that the terminal device may flexibly select a beam used for communicating with the first transmitting and receiving point, so as to ensure communication performance. For example, if beam quality corresponding to an SSB 1 is relatively good, the terminal device may select a downlink reference timing corresponding to the SSB 1 to perform downlink synchronization, and use a TA corresponding to the SSB 1 to perform an uplink timing advance.

The following describes a method for determining, by the terminal device, the first correspondence based on the second correspondence and the third correspondence. The terminal device may maintain a plurality of timing advance groups, and each timing advance group may be associated with one or more SSBs, that is, the terminal device establishes the second correspondence between a TAG (TA) and an SSB. In addition, the terminal device may maintain a plurality of downlink reference timings, and each downlink reference timing is associated with one SSB, that is, the terminal device establishes the third correspondence between an SSB and a downlink reference timing.

For example, the second correspondence is as follows: a TAG 1 is associated with an SSB 1 to an SSB 3, and a TAG 2 is associated with an SSB 4 to an SSB 8; and the third correspondence is as follows: the SSB 1 to the SSB 8 are respectively associated with a downlink reference timing 1 to a downlink reference timing 8. After receiving an SSB (such as an SSB 5), the terminal device determines, based on the second correspondence, that a timing advance corresponding to the SSB 5 is a TA 2, and determines, based on the third correspondence, that a downlink reference timing corresponding to the SSB 5 is a downlink reference timing 5. The terminal device may perform downlink synchronization based on the downlink reference timing 5, and perform uplink transmission by using the TA 2.

It may be understood that a plurality of SSBs may correspond to a same TA, and different SSBs correspond to different downlink reference timings. In this case, in the first correspondence, a same TA may correspond to different downlink reference timings.

In some embodiments, the terminal device may transmit second information to the first transmitting and receiving point. The second information is used to indicate whether the terminal device transmits a physical random access channel (physical random access channel, PRACH) in a directional manner and/or whether the terminal device detects an SSB in a receive beam sweeping manner, and the second information is used to determine the determination mode of the first downlink reference timing. The first transmitting and receiving point may determine the determination mode of the first downlink reference timing based on the second information. The determination mode of the first downlink reference timing may include the third mode and the fourth mode.

In an example, if the terminal device can transmit the PRACH in the directional manner, and the terminal device detects the SSB in the receive beam sweeping manner, the first transmitting and receiving point may use the third mode or the fourth mode as the determination mode of the first downlink reference timing. In another example, if the terminal device transmits the PRACH in an omnidirectional manner, and the terminal device detects the SSB in the receive beam sweeping manner, the first transmitting and receiving point may use the third mode or the fourth mode as the determination mode of the first downlink reference timing. In this case, the first transmitting and receiving point may preferably use the fourth mode as the determination mode of the first downlink reference timing. In another example, if the terminal device cannot detect the SSB in the receive beam sweeping manner, the first transmitting and receiving point may use the fourth mode as the determination mode of the first downlink reference timing.

If the terminal device does not detect the SSB in the receive beam sweeping manner, it indicates that the terminal device may detect only an SSB transmitted by the second transmitting and receiving point. In some embodiments, the terminal device has completed synchronization with the second transmitting and receiving point, but has not completed synchronization with the first transmitting and receiving point. In other words, the terminal device has received the SSB transmitted by the second transmitting and receiving point, but may not receive an SSB transmitted by the first transmitting and receiving point.

The second transmitting and receiving point may be a transmitting and receiving point that has completed synchronization with the terminal device. The first transmitting and receiving point may be a transmitting and receiving point that has not completed synchronization with the terminal device.

With reference to an example, the following describes a process of determining a determination mode of the first downlink reference timing based on the second information. The TRP 2 below may be the first transmitting and receiving point, and the TRP 1 may be the second transmitting and receiving point.

The terminal device communicates with a plurality of TRPs, and the plurality of TRPs include the TRP 1 and the TRP 2. The terminal device synchronizes with the TRP 1 by using an SSB (SSB x) whose index (index) is x in an SSB burst set. The terminal device may successfully detect an SSB y transmitted by the TRP 2, or may fail to detect the SSB y transmitted by the TRP 2. After successfully detecting the SSB x, the terminal device transmits a PRACH.

After receiving the SSB x, the terminal device transmits the PRACH. The PRACH may be determined based on the SSB x, or time-frequency information and/or sequence information of the PRACH may be determined based on the SSB x.

The terminal device may transmit second information to the TRP 2, to indicate whether the terminal device transmits the PRACH in a directional manner and/or whether the terminal device detects an SSB in a receive beam sweeping manner.

If the terminal device transmits the PRACH in an omnidirectional manner, both the TRP 1 and the TRP 2 successfully detect the PRACH. In this case, the TRP 2 may determine, based on the time-frequency information and/or sequence information of the received PRACH, an index of an SSB corresponding to the PRACH, that is, the TRP 2 obtains x through calculation. In other words, the TRP 2 determines that the PRACH is determined based on the SSB x. In other words, the TRP 2 may determine an index of an SSB (SSB x) that is transmitted by the TRP1 and received by the terminal device. Therefore, the TRP 2 may determine the determination mode of the first downlink reference timing based on the SSB x. In addition, if the terminal device can detect the SSB in the receive beam sweeping manner, the terminal device may receive the SSB y transmitted by the TRP 2. Therefore, the TRP 2 may also determine the determination mode of the first downlink reference timing based on the SSB y.

If the terminal device transmits the PRACH in the directional manner, and the terminal device can transmit the PRACH in a direction corresponding to the SSB y, it indicates that the terminal device has received the SSB y transmitted by the TRP 2. In addition, because the PRACH is generated based on the SSB x, the TRP 2 can also learn the SSB x. Therefore, the TRP 2 may determine the determination mode of the first downlink reference timing based on the SSB x, or based on the SSB y.

If the terminal device cannot detect the SSB in the receive beam sweeping manner, it indicates that the terminal device can receive only the SSB x, but cannot receive the SSB y. Therefore, the terminal device cannot determine the first downlink reference timing based on the SSB y, and the TRP 2 can determine the determination mode of the first downlink reference timing based on only the SSB x.

In some implementations, the TRP 1 and the TRP 2 may not directly transmit an SSB, but reference cells of the TRP 1 and the TRP 2 transmit the SSB. For example, if a TRP A is a reference cell of the TRP 1, and a TRP B is a reference cell of the TRP 2, the SSB x is transmitted by the TRP A, and the SSB y is transmitted by the TRP B. Clock synchronization is implemented between the TRP A and the TRP 1, and clock synchronization is implemented between the TRP B and the TRP 2. In other words, the TRP A and the TRP 1 have a same downlink reference timing, and the TRP B and the TRP 2 have a same downlink reference timing.

Figure 5:
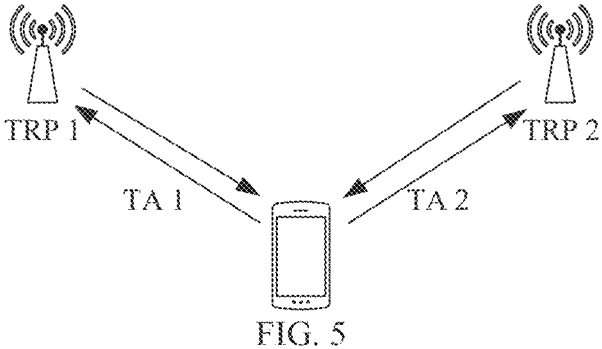
FIG. 5 is a schematic diagram of a method for measuring a location of a terminal device according to an embodiment of the present application.
Figure 6:
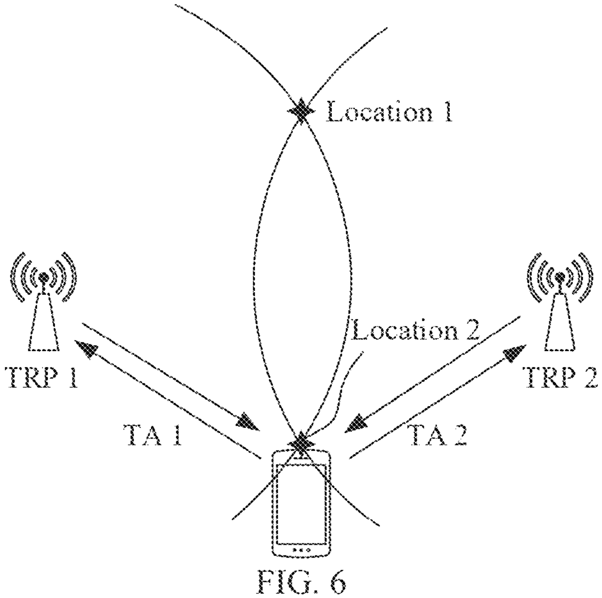
FIG. 6 is a schematic diagram of two possible locations of a terminal device that are measured by using two TRPs.

A TA reflects a distance from the terminal device to a TRP. When there are a plurality of TAs, the terminal device can be located more accurately. FIG. 5 shows a schematic diagram of measuring a location of a terminal device by using two TAs. As shown in FIG. 5, a distance from a terminal device 510 to a TRP 1 may be estimated based on a TA 1, and a distance from the terminal device 510 to a TRP 2 may be estimated based on a TA 2. Because location information of the TRP 1 and the TRP 2 is known, two possible locations may be estimated based on distances from the terminal device 510 to the two TRPs, and the two possible locations are a location 1 and a location 2 shown in FIG. 6.

Figure 7:
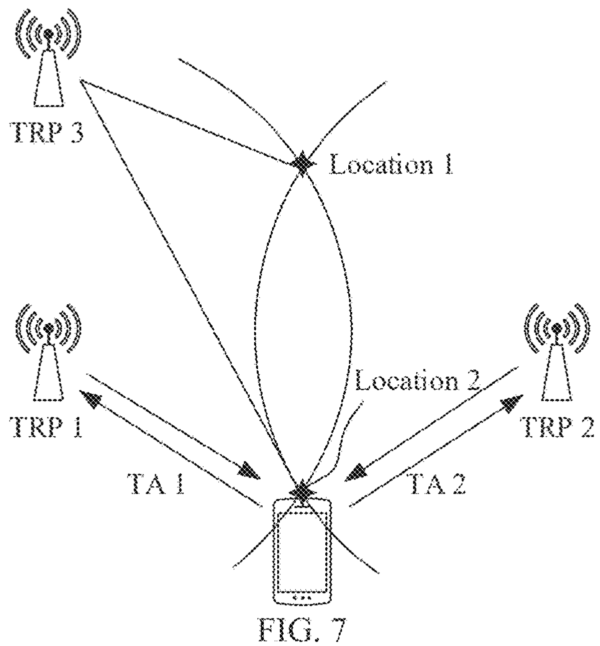
FIG. 7 is a schematic diagram of measuring a location of a terminal device by using three TRPs.

In a case in which a measurement error is not considered, if a location is to be selected from the location 1 and the location 2, the terminal device needs to measure a signal of a third transmitting and receiving point (TRP 3), or the terminal device transmits a signal to the third transmitting and receiving point. A positioning and calculation unit obtains a measurement result by using a measurement result of the TRP 3 or by transmitting the signal to the TRP 3, and therefore determines, based on the measurement result, whether a location of the terminal device is the location 1 or the location 2. As shown in FIG. 7, a distance from the TRP 3 to the location 2 is twice as long as a distance from the TRP 3 to the location 1, there is a difference of approximately 3 dB between reference signal received powers (reference signal receiving power, RSRP) obtained by means of measurement.

Because the terminal device does not have a baseline of an RSRP, the terminal device does not know whether the RSRP obtained by means of measurement is relatively high or relatively low, and a positioning server may perform rough calculation based on a traditional model.

In actual application, there may be a plurality of base stations or TRPs in a communications system, and an approximate location of the terminal device may be estimated based on RSRP measurement results of the plurality of base stations or TRPs, so as to distinguish whether the terminal device is in the location 1 or the location 2.

The method embodiments of the present application are described in detail above with reference to FIG. 1 to FIG. 7. Apparatus embodiments of the present application are described in detail below with reference to FIG. 8 and FIG. 10. It should be understood that the description of the method embodiments corresponds to the description of the apparatus embodiments, and therefore, for a part that is not described in detail, reference may be made to the foregoing method embodiments.

Figure 8:
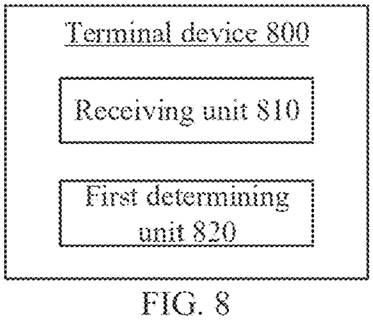
FIG. 8 is a schematic block diagram of a terminal device according to an embodiment of the present application.

FIG. 8 is a schematic block diagram of a terminal device according to an embodiment of the present application. The terminal device may be any one of the terminal devices described above, and the terminal device includes a receiving unit 810 and a first determining unit 820.

The receiving unit 810 is configured to receive first information transmitted by a first transmitting and receiving point.

The first determining unit 820 is configured to determine, based on the first information, a first downlink reference timing corresponding to a first TA. The first TA corresponds to the first transmitting and receiving point, the first transmitting and receiving point is one of a plurality of transmitting and receiving points that communicate with the terminal device, and the first information is used to indicate a determination mode of the first downlink reference timing.

In some implementations, the determination mode of the first downlink reference timing include a first mode and a second mode. In the first mode, the first downlink reference timing is determined based on a first correspondence between a TA and a downlink reference timing. In the second mode, the first downlink reference timing is determined based on an SSB indicated in a PDCCH order.

In some implementations, the first information is represented by using a first bit. If a value of the first bit is 0, the determination mode of the first downlink reference timing is the first mode; or if a value of the first bit is not 0, the determination mode of the first downlink reference timing is the second mode.

In some implementations, the plurality of transmitting and receiving points further include a second transmitting and receiving point, and the determination mode of the first downlink reference signal include a third mode and a fourth mode. In the third mode, the first downlink reference timing is determined based on the first TA; and in the fourth mode, the first downlink reference timing is determined based on a second TA. The second TA corresponds to the second transmitting and receiving point.

In some implementations, in the third mode, the first downlink reference timing is determined based on the first TA and a first correspondence; and in the fourth mode, the first downlink reference timing is determined based on the second TA and the first correspondence. The first correspondence includes a correspondence between a TA and a downlink reference timing.

In some implementations, the first information is represented by using a second bit. If a value of the second bit is 0, the determination mode of the first downlink reference signal is the third mode; or if a value of the second bit is not 0, the determination mode of the first downlink reference signal is the fourth mode.

In some implementations, the first information is carried in DCI.

In some implementations, the terminal device further includes a second determining unit, determining the first correspondence based on a second correspondence and a third correspondence. The second correspondence includes a correspondence between a TA and an SSB, and the third correspondence includes a correspondence between an SSB and a downlink reference timing.

In some implementations, the terminal device further includes a transmitting unit, transmitting second information to the first transmitting and receiving point. The second information is used to indicate whether the terminal device transmits a physical random access channel PRACH in a directional manner and/or whether the terminal device detects an SSB in a receive beam sweeping manner, and the second information is used to determine the determination mode of the first downlink reference timing.

Figure 9:
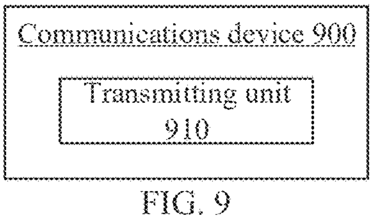
FIG. 9 is a schematic block diagram of a communications device according to an embodiment of the present application.

FIG. 9 is a schematic block diagram of a communications device according to an embodiment of the present application. The communications device may be the first transmitting and receiving point described above. The communications device in FIG. 9 includes:

a transmitting unit 910, transmitting first information to a terminal device. The first information is used by the terminal device to determine, based on the first information, a first downlink reference timing corresponding to a first TA, where the first TA corresponds to the first transmitting and receiving point, the first transmitting and receiving point is one of a plurality of transmitting and receiving points that communicate with the terminal device, and the first information is used to indicate a determination mode of the first downlink reference timing.

In some implementations, the determination mode of the first downlink reference timing includes a first mode and a second mode. In the first mode, the first downlink reference timing is determined based on a first correspondence between a TA and a downlink reference timing. In the second mode, the first downlink reference timing is determined based on an SSB indicated in a PDCCH order.

In some implementations, the first information is represented by using a first bit. If a value of the first bit is 0, the determination mode of the first downlink reference timing is the first mode; or if a value of the first bit is not 0, the determination mode of the first downlink reference timing is the second mode.

In some implementations, the plurality of transmitting and receiving points further include a second transmitting and receiving point, and the determination mode of the first downlink reference signal includes a third mode and a fourth mode. In the third mode, the first downlink reference timing is determined based on the first TA; and in the fourth mode, the first downlink reference timing is determined based on a second TA. The second TA corresponds to the second transmitting and receiving point.

In some implementations, in the third mode, the first downlink reference timing is determined based on the first TA and a first correspondence; and in the fourth mode, the first downlink reference timing is determined based on the second TA and the first correspondence. The first correspondence includes a correspondence between a TA and a downlink reference timing.

In some implementations, the first information is represented by using a second bit. If a value of the second bit is 0, the determination mode of the first downlink reference timing is the third mode; or if a value of the second bit is not 0, the determination mode of the first downlink reference timing is the fourth mode.

In some implementations, the first information is carried in DCI.

In some implementations, the first correspondence is determined based on a second correspondence and a third correspondence. The second correspondence includes a correspondence between a TA and an SSB, and the third correspondence includes a correspondence between an SSB and a downlink reference timing.

In some implementations, the communications device further includes a receiving unit, receiving second information transmitted by the terminal device. The second information is used to indicate whether the terminal device transmits a PRACH in a directional manner and/or whether the terminal device detects an SSB in a receive beam sweeping manner, and the second information is used to determine the determination mode of the first downlink reference timing.

Figure 10:
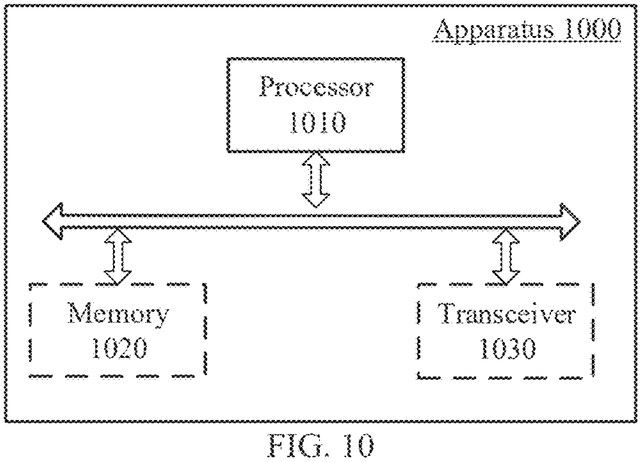
FIG. 10 is a schematic structural diagram of a communications apparatus according to an embodiment of the present application.

FIG. 10 is a schematic structural diagram of a communications apparatus according to an embodiment of the present application. The dashed lines in FIG. 10 indicate that the unit or module is optional. The apparatus 1000 may be configured to implement the method described in the foregoing method embodiments. The apparatus 1000 may be a chip or a communications device. The communications device may be any one of the communications devices described above. For example, the communications device may be a terminal device or a first transmitting and receiving point.

The apparatus 1000 may include one or more processors 1010. The processor 1010 may support the apparatus 1000 in implementing the method described in the foregoing method embodiments. The processor 1010 may be a general-purpose processor or a dedicated processor. For example, the processor may be a central processing unit (central processing unit, CPU). Alternatively, the processor may be another general-purpose processor, a digital signal processor (digital signal processor, DSP), an application-specific integrated circuit (application specific integrated circuit, ASIC), a field programmable gate array (field programmable gate array, FPGA) or another programmable logic device, a discrete gate or transistor logic device, a discrete hardware component, or the like. The general-purpose processor may be a microprocessor, or the processor may be any conventional processor or the like.

The apparatus 1000 may further include one or more memories 1020. The memory 1020 stores a program, and the program may be executed by the processor 1010, so that the processor 1010 executes the method described in the foregoing method embodiments. The memory 1020 may be separate from the processor 1010 or may be integrated into the processor 1010.

The apparatus 1000 may further include a transceiver 1030. The processor 1010 may communicate with another device or chip by using the transceiver 1030. For example, the processor 1010 may transmit data to and receive data from another device or chip by using the transceiver 1030.

An embodiment of the present application further provides a computer-readable storage medium for storing a program. The computer-readable storage medium may be applied to a communications device provided in embodiments of the present application, and the program causes a computer to execute the method executed by the communications device in the embodiments of the present application.

An embodiment of the present application further provides a computer program product. The computer program product includes a program. The computer program product may be applied to a communications device provided in embodiments of the present application, and the program causes a computer to execute the method executed by the communications device in the embodiments of the present application.

An embodiment of the present application further provides a computer program. The computer program may be applied to a communications device provided in embodiments of the present application, and the computer program causes a computer to execute the method executed by the communications device in the embodiments of the present application.

It should be understood that the terms "system" and "network" in the present application may be used interchangeably. In addition, the terms used in the present application are only used to explain specific embodiments of the present application, and are not intended to limit the present application. The terms "first", "second", "third", "fourth", and the like in the specification, claims, and accompanying drawings of the present application are used to distinguish between different objects, rather than to describe a specific order. In addition, the terms "include" and "have" and any variations thereof are intended to cover a non-exclusive inclusion.

In embodiments of the present application, "indication" mentioned herein may be a direct indication, or may be an indirect indication, or may mean that there is an association relationship. For example, A indicates B, which may mean that A directly indicates B, for example, B may be obtained by using A; or may mean that A indirectly indicates B, for example, A indicates C, and B may be obtained by using C; or may mean that there is an association relationship between A and B.

In embodiments of the present application, "include" mentioned herein may refer to direct inclusion, or may refer to indirect inclusion. Optionally, the term "include" mentioned in the embodiments of the present application may be replaced with "indicate" or "be used to". For example, A including B may be replaced with that A indicates B, or A is used to determine B.

In embodiments of the present application, "B corresponding to A" means that B is associated with A, and B may be determined based on A. However, it should be further understood that, determining B based on A does not mean determining B based only on A, but instead, B may be determined based on A and/or other information.

In the embodiments of the present application, the term "correspond" may mean that there is a direct or indirect correspondence between the two, or may mean that there is an association relationship between the two, or may mean that there is a relationship such as indicating and being indicated, or configuring and being configured.

In embodiments of the present application, "pre-definition" or "pre-configuration" may be implemented by pre-storing corresponding code or a corresponding table in a device (for example, including a terminal device and a network device) or in other manners that can be used for indicating related information. A specific implementation thereof is not limited in the present application. For example, pre-definition may refer to being defined in a protocol.

In embodiments of the present application, the "protocol" may refer to a standard protocol in the communications field, which may include, for example, an LTE protocol, an NR protocol, and a related protocol applied to a future communications system. This is not limited in the present application.

In embodiments of the present application, the term "and/or" is merely an association relationship that describes associated objects, and represents that there may be three relationships. For example, A and/or B may represent three cases: only A exists, both A and B exist, and only B exists. In addition, the character "/" in this specification generally indicates an "or" relationship between the associated objects.

In embodiments of the present application, sequence numbers of the foregoing processes do not mean execution sequences. The execution sequences of the processes should be determined based on functions and internal logic of the processes, and should not be construed as any limitation on the implementation processes of the embodiments of the present application.

In several embodiments provided in the present application, it should be understood that, the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections implemented through some interfaces, apparatus, or units, and may be implemented in electronic, mechanical, or other forms.

Units described as separate components may be or may not be physically separate, and components displayed as units may be or may not be physical units, that is, may be located in one place or distributed on a plurality of network units. Some or all of the units may be selected based on actual requirements to achieve objectives of solutions of the embodiments.

In addition, functional units in embodiments of the present application may be integrated into one processing unit, or each of the units may exist alone physically, or two or more units may be integrated into one unit.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedures or functions according to embodiments of the present application are completely or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (such as a coaxial cable, an optical fiber, and a digital subscriber line (digital subscriber line, DSL)) manner or a wireless (such as infrared, wireless, and microwave) manner. The computer-readable storage medium may be any usable medium readable by the computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium (for example, a solid state drive (solid state disk, SSD)), or the like.

The foregoing descriptions are merely specific implementations of the present application, but the protection scope of the present application is not limited thereto. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A wireless communication method, comprising:

receiving, by a terminal device, first information from a first transmitting and receiving point; and determining, by the terminal device based on the first information, a first downlink reference timing corresponding to a first timing advance (TA), wherein the first TA corresponds to the first transmitting and receiving point, the first transmitting and receiving point is one of a plurality of transmitting and receiving points that communicate with the terminal device, and the first information indicates a determination mode of the first downlink reference timing, wherein the plurality of transmitting and receiving points further comprise a second transmitting and receiving point, wherein the first information comprises a second bit indicating whether the first downlink reference timing corresponds to the first transmitting and receiving point or the second transmitting and receiving point, and wherein:

if a value of the second bit is 0, the first downlink reference timing corresponds to the first transmitting and receiving point; or if a value of the second bit is not 0, the first downlink reference timing corresponds to the second transmitting and receiving point.

2. The method according to claim 1, wherein the determination mode of the first downlink reference timing comprises a first mode or a second mode, wherein in the first mode, the first downlink reference timing is determined based on a first correspondence between a TA and a downlink reference timing; and in the second mode, the first downlink reference timing is determined based on a synchronization signal block (SSB) indicated in a physical downlink control channel (PDCCH) command.

3. The method according to claim 2, wherein the first information is represented by using a first bit; and if a value of the first bit is 0, the determination mode of the first downlink reference timing is the first mode; or if a value of the first bit is not 0, the determination mode of the first downlink reference timing is the second mode.

4. The method according to claim 2, wherein the method further comprises:

determining, by the terminal device, the first correspondence based on a second correspondence and a third correspondence, wherein the second correspondence comprises a correspondence between a TA and an SSB, and the third correspondence comprises a correspondence between an SSB and a downlink reference timing.

5. The method according to claim 1, wherein the method further comprises:

transmitting, by the terminal device, second information to the first transmitting and receiving point, wherein the second information indicates at least one of whether the terminal device transmits a physical random access channel (PRACH) in a directional manner or whether the terminal device detects an SSB in a receive beam sweeping manner, and the second information is used to determine the determination mode of the first downlink reference timing.

6. A wireless communication method, comprising:

transmitting, by a first transmitting and receiving point, first information to a terminal device, wherein the first information is used by the terminal device to determine, based on the first information, a first downlink reference timing corresponding to a first timing advance (TA), the first TA corresponds to the first transmitting and receiving point, the first transmitting and receiving point is one of a plurality of transmitting and receiving points that communicate with the terminal device, and the first information indicates a determination mode of the first downlink reference timing, wherein the plurality of transmitting and receiving points further comprise a second transmitting and receiving point, wherein the first information comprises a second bit indicating whether the first downlink reference timing corresponds to the first transmitting and receiving point or the second transmitting and receiving point, and wherein:

if a value of the second bit is 0, the first downlink reference timing corresponds to the first transmitting and receiving point; or if a value of the second bit is not 0, the first downlink reference timing corresponds to the second transmitting and receiving point.

7. The method according to claim 6, wherein the determination mode of the first downlink reference timing comprises a first mode or a second mode, wherein in the first mode, the first downlink reference timing is determined based on a first correspondence between a TA and a downlink reference timing; and in the second mode, the first downlink reference timing is determined based on a synchronization signal block (SSB) indicated in a physical downlink control channel (PDCCH) command.

8. The method according to claim 7, wherein the first information is represented by using a first bit; and if a value of the first bit is 0, the determination mode of the first downlink reference timing is the first mode; or if a value of the first bit is not 0, the determination mode of the first downlink reference timing is the second mode.

9. The method according to claim 6, wherein the method further comprises:

receiving, from the terminal device, second information, wherein the second information indicates at least one of whether the terminal device transmits a physical random access channel (PRACH) in a directional manner or whether the terminal device detects an SSB in a receive beam sweeping manner, and the second information is used to determine the determination mode of the first downlink reference timing.

10. An apparatus, comprising:

at least one processor; and one or more non-transitory computer-readable storage media coupled to the at least one processor and storing programming instructions for execution by the at least one processor, wherein the programming instructions, when executed, cause the apparatus to perform operations comprising:

receiving first information from a first transmitting and receiving point; and determining, based on the first information, a first downlink reference timing corresponding to a first timing advance (TA), wherein the first TA corresponds to the first transmitting and receiving point, the first transmitting and receiving point is one of a plurality of transmitting and receiving points that communicate with the apparatus, and the first information indicates a determination mode of the first downlink reference timing, wherein the plurality of transmitting and receiving points further comprise a second transmitting and receiving point, wherein the first information comprises a second bit indicating whether the first downlink reference timing corresponds to the first transmitting and receiving point or the second transmitting and receiving point, and wherein:

if a value of the second bit is 0, the first downlink reference timing corresponds to the first transmitting and receiving point; or if a value of the second bit is not 0, the first downlink reference timing corresponds to the second transmitting and receiving point.

11. The apparatus according to claim 10, wherein the determination mode of the first downlink reference timing comprises a first mode or a second mode, wherein in the first mode, the first downlink reference timing is determined based on a first correspondence between a TA and a downlink reference timing; and in the second mode, the first downlink reference timing is determined based on a synchronization signal block (SSB) indicated in a physical downlink control channel (PDCCH) command.

12. The apparatus according to claim 11, wherein the first information is represented by using a first bit; and if a value of the first bit is 0, the determination mode of the first downlink reference timing is the first mode; or if a value of the first bit is not 0, the determination mode of the first downlink reference timing is the second mode.

13. The apparatus according to claim 11, wherein the operations further comprise:

determining the first correspondence based on a second correspondence and a third correspondence, wherein the second correspondence comprises a correspondence between a TA and an SSB, and the third correspondence comprises a correspondence between an SSB and a downlink reference timing.

14. The apparatus according to claim 10, wherein the operations further comprise:

transmitting second information to the first transmitting and receiving point, wherein the second information indicates at least one of whether the apparatus transmits a physical random access channel (PRACH) in a directional manner or whether the apparatus detects an SSB in a receive beam sweeping manner, and the second information is used to determine the determination mode of the first downlink reference timing.

* * * * *